United States Patent
Amanullah et al.

(10) Patent No.: US 9,944,841 B2
(45) Date of Patent: Apr. 17, 2018

(54) METHOD FOR REDUCING FLUID LOSS DURING DRILLING OF A HYDROCARBON FORMATION USING A WATER-BASED DRILLING FLUID COMPOSITION HAVING A MULTIFUNCTIONAL MUD ADDITIVE

(71) Applicant: Saudi Arabian Oil Company, Dhahran (SA)

(72) Inventors: Md. Amanullah, Dhahran (SA); Mohammed K. Al-Arfaj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/637,467

(22) Filed: Mar. 4, 2015

(65) Prior Publication Data
US 2015/0210912 A1   Jul. 30, 2015

Related U.S. Application Data

(63) Continuation of application No. 13/610,408, filed on Sep. 11, 2012, now Pat. No. 9,006,151.

(60) Provisional application No. 61/533,536, filed on Sep. 12, 2011.

(51) Int. Cl.
*C09K 8/08* (2006.01)
*C09K 8/20* (2006.01)
*E21B 7/00* (2006.01)

(52) U.S. Cl.
CPC .............. *C09K 8/08* (2013.01); *C09K 8/20* (2013.01); *E21B 7/00* (2013.01); *C09K 2208/04* (2013.01); *C09K 2208/10* (2013.01)

(58) Field of Classification Search
CPC  C09K 8/145; C09K 2208/04; C09K 2208/10; C09K 8/08; C09K 8/20; C09K 8/04; C09K 8/16; C09K 8/50; C09K 8/506; C09K 8/516; E21B 7/00; E21B 43/04; E21B 43/26; E21B 33/14; E21B 43/24; E21B 34/14; E21B 36/04; E21B 37/08; E21B 43/02; E21B 34/06; E21B 33/03; E21B 33/068; E21B 33/1208; E21B 33/13; E21B 43/088; E21B 43/10; E21B 43/2401; E21B 43/2405
See application file for complete search history.

(56) References Cited

U.S. PATENT DOCUMENTS

| | | | | | |
|---|---|---|---|---|---|
| 2,209,591 | A | * | 7/1940 | Barnes | C09K 8/22 175/65 |
| 3,557,876 | A | * | 1/1971 | Tragesser | C09K 8/05 166/292 |
| 4,192,753 | A | * | 3/1980 | Pye | C09K 8/24 166/283 |
| 5,415,228 | A | * | 5/1995 | Price | C09K 8/16 166/278 |
| 8,003,152 | B1 | * | 8/2011 | Xiong | A23C 9/1544 426/573 |
| 2006/0046937 | A1 | * | 3/2006 | Fu | B82Y 30/00 507/131 |
| 2008/0023091 | A1 | * | 1/2008 | Clarke | C04B 18/248 138/97 |
| 2009/0082230 | A1 | * | 3/2009 | Javora | C09K 8/04 507/269 |
| 2011/0275736 | A1 | * | 11/2011 | Iverson | C04B 24/38 523/130 |
| 2011/0312857 | A1 | * | 12/2011 | Amanullah | C09K 8/70 507/112 |
| 2012/0108471 | A1 | * | 5/2012 | Amanullah | C09K 8/08 507/104 |

FOREIGN PATENT DOCUMENTS

CA     2553124 A1    1/2008
WO   2012061187 A2   5/2012

OTHER PUBLICATIONS https://en.wikipedia.org/w/index.php?title=Microparticle&printable=yes downloaded on Jun. 10, 2016.*
Anonymous, Monograph—Plantago ovata (Psyllium), Alternative Medicine Review, Jan. 1, 2002, pp. 155-159, vol. 7, Sandpoint USA.
M. Amanullah, et al., Preliminary test results of nano-based drilling fluids for oil and gas field application SPE/IADC Drilling Conference and Exhibition, Mar. 1-3, 2011, Amsterdam, The Netherlands.
International Search Report and Written Opinion issued in related International Patent Application No. PCT/US2012/054704; dated Nov. 27, 2012; 14 pages.

* cited by examiner

*Primary Examiner* — Kumar R Bhushan
(74) *Attorney, Agent, or Firm* — Bracewell LLP; Constance G. Rhebergen; Brian H. Tompkins

(57) ABSTRACT

Embodiments of the invention provide a drilling, drill-in, and completion water-based mud composition containing micro or nanoparticles for use in hydrocarbon drilling. In accordance with at least one embodiment, there is provided a method of drilling a hydrocarbon formation, including contacting the hydrocarbon formation with a water-based drilling mud composition while drilling or completing a well. In accordance with at least one embodiment, the water-based drilling mud composition includes water, the water being present in an amount greater than about 90 wt % of the water-based drilling mud composition to maintain flowability of the water-based drilling mud composition; drilling mud having microparticles, nanoparticles, and combinations thereof; and a multi-functional mud additive in an amount of 0.8 wt % of the water-based drilling mud composition, the multi-functional mud additive comprising psyllium husk powder.

21 Claims, No Drawings

METHOD FOR REDUCING FLUID LOSS DURING DRILLING OF A HYDROCARBON FORMATION USING A WATER-BASED DRILLING FLUID COMPOSITION HAVING A MULTIFUNCTIONAL MUD ADDITIVE

RELATED APPLICATIONS

This application is related to, and claims priority to, U.S. Provisional Patent Application No. 61/533,536, filed on Sep. 12, 2011, and is a continuation of U.S. patent application Ser. No. 13/610,408, filed on Sep. 11, 2012, which are all incorporated by reference in their entirety.

FIELD OF THE INVENTION

Embodiments of the invention generally relate to a multifunctional mud additive as part of a water-based drilling fluid. More particularly, embodiments of the invention relate to a multifunctional mud additive that is capable of producing stable, homogeneous and long lasting water-based drilling fluids containing particles, including nanoparticles, microparticles, or a combination thereof, by providing effective shielding around the particles, especially nanoparticles.

BACKGROUND

Specially-formulated fluids are used during drilling and production of hydrocarbons to fulfill different functional requirements, conduct trouble-free drilling and production operations, improve drilling efficiency and productivity of wells, and enhance the return on investment. Various types of fluids having different chemical compositions are used in such hydrocarbon drilling and production processes. For example, drilling and drill-in fluids, which are generally composed of a fluid phase, a chemical phase, and a solid phase, are used while drilling for hole cleaning, borehole stabilization, cuttings suspension during non circulation, formation damage mitigation while drilling the reservoir section, and the like. As another example, fracturing and stimulating fluids, which are typically composed of a fluid phase, a chemical phase, and a pseudo solid phase, are generally used to enhance the productivity of a field, especially a field with very low matrix permeability or a field that has incurred extensive formation damage while drilling.

Each of these fluids performs various functions during drilling and production applications. For example, during drilling operations, drilling and/or drill-in fluids are circulated through the drill string to exit through the bit nozzles at high speed to remove the cuttings, clean the bit, transport the cuttings to the surface, prevent fluid loss and particulate invasion to the reservoir, and the like. Similarly, during fracturing or stimulation operations of low permeable formations, a fracturing or stimulation fluid is pumped into the formation to improve the fluid flow characteristics of the field.

Conventional micro and/or macro particle-based fluids are commonly used in many drilling fluids because of their low manufacturing cost and availability in the market at a competitive price. For purposes of this application, "micro" particle-based fluids generally have an average particle distribution of greater than about 1 micron. Whereas, the "macro" particle-based fluids generally have an average particle distribution of equal to or greater than about 1 mm.

Although these conventional drilling fluids are effective for many applications, they have limited capability and may not be suitable for some current as well as some future drilling and production operations due to the increasingly challenging conditions of such operations. Many of the conventional micro and/or macro particle-based drilling fluids have limited functional capabilities due to size effect, have low area-to-volume ratios, are difficult to manipulate to prepare tailor-made particles with custom-made properties, predominant role of physical and gravitational forces in the particle behavior, and have a lack of quantum effect due to trivial boundary effects.

Over the years, the operational conditions of drilling and production have continued to become increasingly more extreme. For example, changes in the operational depth, nature of subsurface geohazards with increasing depth, length of horizontal departure to maximize production, complexity of drilling operations, shape of wellbore profiles or number of laterals from a mother bore to maximize reservoir contact, and the like, all make drilling and production much more difficult. Moreover, the significant changes in the physical, chemical, and thermal conditions of deeper horizons restrict the use of many conventional drilling fluids above a certain operational set point due to the limited physical, chemical, thermal, and time dependant stability of many conventional drilling fluids.

Because of the current limitations that exist using conventional drilling fluids, it is often impossible to fulfill certain functional tasks that are essential in challenging drilling and production environments using conventional macro and micro type fluid additives. A need exists for strong, stable, and customizable fluids to use in all areas of oil and gas exploration and exploitation.

Nanoparticles are becoming increasingly popular for use in developing viable drilling, drill-in, fracturing, and stimulation fluids, particularly water-based drilling fluids or muds, for example, biologically-stable drilling and completion fluids using silver nano-particles, non-corrosive drilling fluids using nano-zincoxide, thermally-stable fluids using nano-silica, high-thixotropic fluids using nano-clay. Due to totally unexpected and, in certain cases, highly enhanced chemical, mechanical, electrical, physical, thermal, and hydrodynamic properties and interaction potential of nanomaterials compared to their parent materials, nanoparticles are of interest as a material of choice for developing viable drilling, drill-in, fracturing, and stimulation fluids for oil and gas field applications. Moreover, due to the scope of manufacturing of tailor-made nanomaterials with custom-made functional behavior, ionic nature, physical shape and sizes, charge density/unit volume, nanotechnology is being used in the development of new drilling, drill-in, fracturing, and stimulation fluids for drilling, production, and stimulation-related applications.

Unfortunately, the formulation of viable drilling, drill-in, fracturing, and stimulation fluids has been difficult using nanoparticles due to the active role of surface and molecular forces in the nanomaterial behavior. The solution to this problem in other industries has been to use a chemical dispersing agent, solvents, surfactants, and/or various other additives to prepare a viable nanofluid with homogeneous characteristics and long-term stability. Because the oil and gas industry uses huge quantity fluids to drill a well, the high cost of using expensive additives, such as chemical dispersing agents, in the preparation of nanofluids is not feasible for oil and gas field applications.

Drilling fluids contribute to some of the biggest drilling and production costs associated with hydrocarbon recovery. Minimization of the cost factor associated with fluids, especially nano-based fluids, is one of the major considerations in nanofluid formulation and preparation. Moreover, nanomaterials are also very costly on their own. The addition of another costly chemical as a dispersing agent could increase the cost of nano-based drilling fluids far beyond the industry acceptable economic norm. The industry needs a technically reliable and economically attractive method for the preparation of a stable nano-based drilling fluid to meet the current as well as future technical needs and challenges of the oil and gas industry.

Besides cost, other factors, such as the environmental impact of such drilling fluids, come into play when developing drilling fluids. Due to the enactment of increasingly strict environmental laws and regulations and setting of high environmental norms by environmental protection agencies, and federal, state and local governments, environmental factors are another major consideration in oil and gas field applications due to the requirement for huge volumes of nanofluids compared to other industries. The oil and gas industry needs an economically attractive and environmentally friendly fluid additive to prepare water-based nanofluids with a view to maintain the environmental friendliness of the fluid. For example, it would be desirable to have an improved process for refining naphtha that resulted in an improved gasoline blend.

Typical micro and nanoparticle-based mud formulations using aqueous and non-aqueous fluids require different types of mud additives to fulfill various functional tasks while drilling. This is due to the fact that conventional mud additives that are used in drilling, drill-in and completion fluid formulations are single functional. In other words, they are able to perform a single task in the fluid system. The use of single functional additives in the fluid system increases the total number of mud additives and increases the total concentration of the particles in the fluid systems. This high particle concentration of the fluid system has a detrimental effect on the rate of penetration, due to the fact that mud performance (i.e., penetration) is inversely proportional with particle concentration in the drilling mud. Additionally, costs are directly proportional with particle concentration, contributing to higher costs associated with conventional methods and mud additives.

It would be advantageous to have a mud formulation with a reduced amount of additives, and therefore, a lower overall cost. It would also be advantageous to have a mud formulation having better dispersion of the particles and increased rates of penetration and overall performance of the drilling mud. It would also be advantageous to have a mud formulation that reduces handling, transportation, storage, and mud management costs associated therewith, contributing to additional reductions in the total drilling cost.

It would be advantageous to have a multifunctional mud additive for a conventional and nano-based fluid formulation that has similar or better technical performance and environmental compliance compared to conventional eco-friendly mud systems.

It would also be advantageous to have a multifunctional mud additive that provides effective shielding to the nanoparticles or nanoflocs to minimize the effect of molecular, Wan der Waals, and other surface forces.

It would be advantageous to have a multi-functional mud additive that maintains the short and long term stability of nano-based fluids by steric stabilization of the nanoparticles to prevent their flocculation, aggregation, bundling and precipitation.

It would be advantageous to have a multifunctional mud additive that serves as a secondary viscosifer to create a synergistic effect on the viscous properties of the nano-based fluid. It would also be advantageous to have a multifunctional mud additive that enhances the gelling properties of the nano-based fluid during the period of non-circulation. It would be advantageous to have a multifunctional mud additive that controls American Petroleum Institute fluid (API) loss below an API recommended value.

Furthermore, it would be advantageous to have a multifunctional mud additive that produces a well-dispersed, very thin, low permeable mudcake on a borehole wall. It would also be advantageous to have a multifunctional mud additive that has no detrimental effect to the surrounding environment, ecosystems, habitats, and the like. It would be advantageous to have a multifunctional mud additive that has no detrimental effect on the health and safety of mud technicians, mud engineers, and the rig crews. Furthermore, it would be advantageous to have a multifunctional mud additive that reduces the total number of mud additives required for the formulation of macro and nanoparticle based fluids. It would be advantageous to have a multifunctional mud additive that provides an economically attractive mud formulation for oil and gas industry applications.

SUMMARY OF THE INVENTION

Due to extremely high surface areas of nano-based materials compared to micro-materials, the presence of a tiny concentration of nanomaterials (e.g., nanoparticles) provides superior fluid properties to overcome subsurface drilling challenges. Nanoparticles play an important role in improving fluid quality, performance, stability, etc. For example, in nano-based drilling mud, nanomaterials accumulate within the mudcake to reduce mudcake permeability and overall fluid loss behaviour of the drilling mud. Due to their potentially high interacting potential, inhibition capability, ease of infiltration, superior mobility, and high catalytic action, nano-based fluids show superior performance while drilling.

Embodiments of the invention are directed to a composition and method that satisfies at least one of the needs discussed above. For example, in accordance with one embodiment, the composition is a water-based drilling mud composition for reducing fluid loss during drilling. The water-based drilling mud composition includes water, drilling mud, and an effective amount of a multifunctional mud additive. In at least one other embodiment, the water is present in an amount sufficient to maintain flowability of the water-based drilling mud composition. In another embodiment, the drilling mud includes particles, which are selected from the group consisting of microparticles, nanoparticles, and combinations thereof. The drilling mud includes, for example, XC polymer, phyllium husk, carbon black, nano-clay, single-walled carbon nanotube, multi-walled carbon nanotube, and nano-silver. Water invasion minimization using nano-particles, nano-clays, shale reaction minimization using nano-inhibitors is also provided. In another embodiment, the multifunctional mud additive includes psyllium husk powder, with the water-based drilling mud composition being operable to keep the particles stabilized and dispersed throughout the water-based drilling mud composition in the absence of a surfactant.

In another embodiment, the multifunctional mud additive has an effective volume-to-surface area ratio, such that the multifunctional mud additive is operable to reduce the van der Waals forces between the particles such that the particles do not stick together. In one embodiment, the psyllium husk powder has an average diameter in the range of about 50 to 150 microns, most preferably about 100 microns.

In another embodiment, the multifunctional mud additive is operable to increase the viscosity of the water-based drilling mud composition.

In one embodiment, the multifunctional mud additive is operable to increase the viscosity of the water-based drilling mud composition by at least 10 centipoise (cP), when the effective amount of multifunctional mud additive represents approximately 0.8 weight percent (wt %) of the composition. In another embodiment, the water-based drilling mud composition has a viscosity that ranges from about 10 cP to about 30 cP. In another embodiment, the multifunctional mud additive is operable to provide additional gelling capacity for the water-based drilling mud composition. In another embodiment, the composition does not include a dispersant, polyanionic cellulose, or psyllium seed particles. In another embodiment, the composition includes xanthan gum in an amount sufficient to create a synergistic effect to enhance the viscous properties of the water-based drilling mud composition. In another embodiment, the composition includes volcanic ash in an amount sufficient to enhance the rigidity of the mudcake. In accordance with yet another embodiment, the multifunctional mud additive consists essentially of psyllium husk powder.

In another embodiment, the nanoparticles optionally include any or all of the following: carbon black, single wall nanotubes, multiwall nanotubes, functionalized carbon blacks, functionalized single wall nanotubes, functionalized multiwall nanotubes, and graphene. In one embodiment, the nanoparticles have an average diameter in the range of about 10 to 100 nanometers, most preferably about 50 nanometers. In another embodiment, the microparticles optionally include any or all of the following: bentonite, volcanic ash, mica, and carbonate chips. The presence of these microparticles creates a synergistic effect with the nano-based particles and other mud additives to produce a good quality mudcake with low poro-perm characteristics. In one embodiment, the microparticles have an average diameter in the range of about 2 to 100 microns, most preferably about 40 microns.

In another embodiment, the water-based drilling mud composition also includes a pH buffer present in an amount sufficient to maintain a pH of the water-based drilling mud composition in a predetermined pH range. In one embodiment, the predetermined pH range is alkaline. In one embodiment, the pH buffer includes sodium hydroxide, potassium hydroxide, lime, or combinations thereof, as non-limiting examples.

In one embodiment, the water-based drilling mud composition includes 2 pounds per barrel (ppb) of 99% pure psyllium husk powder with 2 ppb of xanthan gum, 3 ppb of 85% pure psyllium husk powder with 3 ppb of xanthan gum, and 20 ppb of volcanic ash. The water in the water-based drilling mud composition is present in an amount greater than about 90 wt % of the water-based drilling mud composition, such that the water-based drilling mud composition is operable to keep the particles stabilized for at least 48 hours following a hot rolling treatment.

In another embodiment, the water-based drilling mud composition has a plastic viscosity of at least 15 cP, a yield point of at least 45 lbs/100 ft$^2$, and a 10/10 gel strength of at least 25/30 lbs/100 ft$^2$. This water-based drilling mud composition is operable to achieve an API fluid loss of less than 15 cc and a mudcake thickness of less than 2 mm. In one embodiment, the volcanic ash includes, for example, silica, aluminum oxide, lime, ferric oxide, magnesium oxide, or combinations thereof.

In another embodiment, the water-based drilling mud composition includes 3 ppb of 85% pure psyllium husk powder with 3 ppb of xanthan gum, and a pH buffer in an amount sufficient to keep the water-based drilling mud composition in an alkaline pH. The water in this water-based drilling mud composition is present in an amount greater than about 90 wt % of the water-based drilling mud composition, whereby the nanoparticles of the water-based drilling mud composition include COOH functionalized nanoparticles. This water-based drilling mud composition is operable to keep the particles stabilized and dispersed for at least 48 hours following a hot rolling treatment. In a further embodiment, the composition has a plastic viscosity of less than 20 cP, a yield point of at least 25 lbs/100 ft$^2$, and a 10/10 gel strength of at least 27/33 lbs/100 ft$^2$, wherein the composition is operable to achieve an API fluid loss of less than 15 cc and a mudcake thickness of less than 2 mm.

In another embodiment, the invention provides for a method of drilling a hydrocarbon formation and contacting the hydrocarbon formation with any of the water-based drilling mud compositions described above. In one embodiment, the step of contacting the hydrocarbon formation with the water-based drilling mud composition is performed prior to having a loss of circulation of fluids in excess of one barrel per hour. In one embodiment, the multifunctional mud additive has an effective volume-to-surface area ratio, such that the multifunctional mud additive is operable to reduce the van der Waals forces between the particles such that the particles do not stick together. In accordance with yet another embodiment, the water-based drilling mud composition is operable to provide sufficient lubrication, weighting, and heat dispersion for conventional drilling, drill-in, fracturing, and stimulation applications.

In accordance with at least one embodiment, there is provided a method of drilling a hydrocarbon formation, including contacting the hydrocarbon formation with a water-based drilling mud composition while drilling or completing a well. In accordance with at least one embodiment, the water-based drilling mud composition includes water, the water being present in an amount greater than about 90 wt % of the water-based drilling mud composition to maintain flowability of the water-based drilling mud composition; drilling mud, the drilling mud comprising particles, wherein the particles are selected from the group consisting of microparticles, nanoparticles, and combinations thereof; and a multi-functional mud additive in an amount of 0.8 wt % of the water-based drilling mud composition, the multi-functional mud additive comprising psyllium husk powder, such that the water-based drilling mud composition is operable to keep the particles stabilized and dispersed throughout the drilling mud composition in the absence of a surfactant.

DETAILED DESCRIPTION OF THE INVENTION

The present invention will now be described more fully hereinafter. This invention may be embodied in many different forms and should not be construed as limited to the described embodiments set forth herein. Rather, these embodiments are provided so that this disclosure will be thorough and complete, and will fully convey the scope of the invention to those skilled in the art.

The mixing, dispersion, homogenization and stabilization of colloidal particles ranging from several microns to several nanometers is very difficult in conventional water-based mud systems without the use of a highly effective dispersing agent and very powerful mechanical agitation, while mixing the fluid components. With regards to mechanical agitation, the use of a hot plate and a conventional magnetic stirrer have been unable to provide sufficient mixing energy for homogenization. The use of powerful and costly dispersants, for example, a nanospersene can be used. However, as the formulation cost is prohibitively high using the nanospersene, it is not an economically viable method of preparation. The difficulty in homogenization, along with short and long term stabilization of water-based systems, increases significantly with decreasing size of the colloidal particles. Therefore, homogeneous and long-lasting drilling fluid formulations using nanoparticles have been extremely difficult to produce prior to the development of the micro- and nano-based drilling mud formulations according to various embodiments of the invention.

As generally discussed above, conventional micro and/or macro particle-based fluids have limited functional capabilities due to low area-to-volume ratios and are difficult to prepare tailor-made particles with custom-made behavior. Moreover, because the predominant role of physical and gravitational forces affect particle behavior, there is a lack of quantum effect due to trivial boundary effects.

Surface forces contribute to the issues associated with the stabilization of the particles. For example, surface forces keep the particles under the dominion of highly attractive van der Waals and other molecular forces. Therefore, the absence of any highly-effective, chemical dispersing or physical shielding agents can trigger the quick flocculation and aggregation of the nanoparticles, which leads to a variation in consistency and particle segregation. Additionally, if a drilling mud has a short stability time, phase separation occurs faster and ultimately leads to destabilization of the drilling fluid. This is the reason why conventional compositions employ the use of costly chemical dispersing additives, for example, in order to provide for effective dispersion and long term stabilization of nanoparticles in aqueous and non-aqueous systems used by other industries. Dispersants typically used in water-based drilling fluids or muds are costly and not feasible for drilling fluid applications due to the excessively high formulation costs.

Due to the relatively large amount of fluid required for drilling, drill-in, and completion operations, the formulation of a nano-based fluid must consider economic factors along with other technical and environmental factors to be acceptable in the oil and gas industry.

According to some embodiments, there is provided a multifunctional mud additive that produces stable, homogeneous and long lasting water-based fluids, for example, micro- and nano-based drilling, drill-in and completion fluid formulations, such as a water-based drilling mud composition, which contains particles, including nanoparticles, microparticles, or a combination thereof, by providing effective shielding around the particles, especially nanoparticles. The multifunctional mud additive has a diameter in the micron range and is effective in stabilizing and dispersing the nano-sized and other micro-sized particles in the water-based drilling mud composition. For example, the multifunctional mud additive is operable to keep microparticles or nanoparticles stabilized and dispersed in the water-based drilling mud composition without the use of a surfactant or dispersant. The multifunctional mud additive provides a mechanical steric hindrance to the naturally-occurring van der Waals forces.

In accordance with certain embodiments, the "multifunctional" nature of the additive allows it to perform several functional tasks simultaneously in the fluid system. For example, the multifunctional mud additive: (1) generates adequate viscous and gel strength characteristics as a secondary viscosifier, (2) reduces the fluid loss potential of drilling fluids by forming a low permeable barrier, (3) keeps cuttings in dynamic suspension to enhance hole cleaning efficiency while drilling, (4) maintains static suspension of the cuttings during the period of non-circulation, (5) prevents the loss of fluid in dynamic and static conditions, and (6) protects the surrounding environment from any detrimental effect of the drilling fluids by virtue of its eco-friendly nature.

As generally discussed above, because of the enactment of increasingly strict environmental laws and regulations, as well as the setting of high environmental norms by environmental protection agencies, and federal, state and local governments, environmental considerations have become increasingly more important in designing drilling fluid for oil and gas field applications. In accordance with at least one embodiment, there is provided a multifunctional mud additive that is an environmentally friendly additive that will cause no negative impact to the surrounding environment, ecosystem, habitats, and localities when used during drilling operations. The multifunctional mud additive also has no detrimental effect on the occupational health and safety of drilling personnel. According to various embodiments, there is also provided an economically-attractive and environmentally-friendly method for preparing micro and nanoparticle-based aqueous and non-aqueous fluids, including the multifunctional mud additive, for oil and gas field applications.

The multifunctional mud additive, according to various embodiments, has a high efficiency for homogenization, stabilization, and dispersement of the particles in the water-based drilling mud composition, which plays an important role in the formulation of highly stable micro and nanoparticle-based fluids for oil and gas field applications. For example, the multifunctional mud additive uses less than 2% by weight to formulate drilling, drill-in, and completion fluids to perform different functional tasks. The multifunctional mud additive is also useful for a wide range of pH values, including, for example, both acidic and basic ranges, and also useful in the presence of various salts, including, for example, monovalent and divalent salts. In accordance with at least one other embodiment, the multifunctional mud additive is equally applicable for micro- and nano-based drilling mud compositions using aqueous fluids as the continuous phase.

In other embodiments, the multifunctional mud additive produces an effective coating and encapsulation around nanoparticles to prevent their flocculation, aggregation, or bundling by neutralizing the effect of van der Waals and other molecular forces of attraction acting on the nanoparticles. The multifunctional mud additive also possesses a steric stabilization potential for the nanoparticles to prevent their flocculation and aggregation during static ageing in water and salt water-based mud compositions. In certain embodiments, the multifunctional mud additive controls the loss of fluid in water and salt water-based mud compositions to a value that is lower than an API-recommended value for typical water and salt water-based mud compositions.

The multifunctional mud additive, according to various embodiments, serves as a secondary viscosifier to enhance the viscosity of the water-based drilling mud composition, while also providing fluid loss properties to the water-based drilling mud composition. The water-based drilling mud composition can be made without the use of polyanionic cellulose, which is typically required for some water-based mud compositions. Additionally, various embodiments provide fluid loss control, enhance cuttings suspension, provide extra gelling capacity, and enhance mud viscosity of the water-based drilling mud composition. Fluid loss additives are used to keep the loss of fluid below 1 barrel (bbl)/hr, whereas a loss circulation additive is only used when the loss of fluid is above 1 bbl/hr.

Some embodiments of the invention further provide a multifunctional organic additive to fulfill several functional tasks in conventional and nano-based fluid systems containing fresh or salt water as the fluid phase. In other embodiments, there is provided a multi-functional mud additive that is dispersible in fresh and salt water systems at room temperature. In other embodiments, a multi-functional mud additive is provided, which has a high volume swelling factor in fresh and salt waters.

In accordance with at least one embodiment, the multifunctional mud additive consists essentially of psyllium husk powder. Psyllium husk, as opposed to the seed, contains a large quantity of mucilage. Psyllium husk acts as a gelling agent that has the ability to encircle nanoparticles, thereby minimizing the effect of inter-particle attractive forces. The psyllium husk powder is a great multifunctional mud additive because it serves, for example, as a secondary viscosifier, a fluid loss additive, a gel strength enhancer, a low-end rheology improver, and an environmental impact reducer.

Additionally, psyllium husk is highly hydrophilic, and therefore experiences no swelling or gelling in the oil phase or in the presence of oil. Consequently, psyllium husk is not very effective for oil-based muds. Similarly, water-based additives are rarely applicable for oil-based drilling mud. As such, oil-based muds have their own class of mud additives, such as oil-loving or oil-wetting mud additives. Additionally, the hydrophilic properties of the psyllium husk vary depending on the purity of the product. For example, a product of 99% purity has a swelling potential of more than 50 ml/g, whereas a product of 85% purity has a swelling of about 30 ml/g or more.

Embodiments of the invention further provide a multi-functional mud additive that includes a flaky outer husk of organic seeds. The flaky outer husk assists in creating a stable and homogeneous mud composition without the use of any costly dispersing additive. In at least one embodiment, the husks from the organic seeds are produced by plantago Ovata. The flaky organic husk is treated and processed in a fashion to maximize its steric and viscosifying potential for conventional and nano-based mud compositions containing water or salt water as the fluid phase. In one embodiment, the steps taken to maximize steric and viscosifying potential include sufficiently drying the flaky husk and grinding the flaky husky to a predefined particle size. The flaky husky is dried overnight at 105° C. At this temperature, the physically bonded water can effectively be removed from the surface of the material. Chemically-bonded water typically needs a temperature of about 400° C. in order to be removed effectively. In one embodiment, only the physically-bonded water is removed in order to achieve improved crushing and grinding without causing any associations of flocs due to plastic effect. In another embodiment, the flaky husk is ground to a particle size of, for example, about less than 200 microns.

In accordance with another embodiment, the flaky husk is present in the mud additive in an amount of, for example, about 1 to 1.5 wt %. The husk particles have a purity of, for example, at least 85% by weight, while in another embodiment, the husk particles have a purity between about 85% and about 99% by weight. The mud additive using husk particles with a 99% purity will have a higher swelling value compared to the mud additive using husk particles with a 85% purity.

In accordance with other embodiments, there is provided an alkaline additive to prevent biological degradation of the multifunctional mud additive and to reduce foul odors in the water-based drilling mud composition. The alkaline additive is selected from the group consisting of sodium hydroxide, potassium hydroxide, lime, or combinations thereof. In accordance with at least one embodiment, 1N sodium hydroxide can be used as the alkaline additive to prevent the biological degradation and foul odor formation.

In one embodiment, the mud composition includes, for example, about 2.0 to 2.5 g of the multifunctional mud additive, about 350 cc of water, for example, either fresh or salt water, and 1 N of an alkaline additive. In another embodiment, 2 cc of 1 N NaOH is used.

EXAMPLES

The examples described below show certain exemplary embodiments of the water-based drilling mud composition including a multi-functional mud additive according to various embodiments, as described herein.

Example 1 (Microparticle-Based Drilling Mud)

A water-based drilling mud composition containing microparticles, in accordance with various embodiments of the invention, was prepared by mixing 2 ppb of 99% purity and 3 ppb of 85% purity psyllium husk powder (PHP), 340 ml of water, 20 gm of volcanic ash, for example, with a particle size range of D10=2.88 micron, D50=13.58 micron and D90=37.35 micron, and 2 ppb of XC polymer for 99% purity PHP and 3 ppb of XC polymer for 85% purity PHP. All the components were mixed to produce the water-based drilling mud composition according to various embodiments discussed above. The PHP enhanced the stabilization of the micro-sized particles by keeping them homogeneous and suspended for a long time, for example, more than 72 hours, before and after hot rolling at 200° F. (i.e., stabilized and dispersed throughout the water-based drilling mud composition in the absence of a surfactant), The PHP also created a good quality mudcake on API filter paper to control the fluid loss below an API-recommended value of 15 cc/30 minutes.

The water-based drilling mud composition was maintained in a specific pH range, for example, an alkaline pH range, by adding a pH buffer, for example, sodium hydroxide into the microparticle-based fluid system to minimize a corrosive effect on surface and down hole tools and equipment. According to some embodiments, in the event of foaming during mixing, a couple of drops of defoamer are added to eliminate the foaming effect and maintain homogeneous density along the fluid column.

The water-based drilling mud composition produced a plastic viscosity, for example, of at least 15 cP, a yield point, for example, of at least 45 lbs/100 ft$^2$, a 10/10 gel strength, for example, of at least 25/30 lbs/100 ft$^2$/lbs, an API fluid loss, for example, less than 10 cc, and a mudcake thickness, for example, less than 2 mm, before and after hot rolling at a temperature range of between 195° F.-200° F.

Example 2 (Nanoparticle-Based Drilling Mud)

A water-based drilling mud composition containing nanoparticles, in accordance with various embodiments of the invention, was prepared by mixing 3 ppb of 85% purity PHP with a COOH functionalized nanoparticle-based drilling mud containing 350 ml water and 3 ppb of XC polymer. All the components were mixed to produce the water-based drilling mud composition according to various embodiments discussed above. The PHP enhanced the stabilization of the nano-sized particles by shielding the van der Waals and other molecular forces, thus keeping the nanoparticles in a homogeneous and suspended condition for a long time (i.e., stabilized and dispersed throughout the water-based drilling mud composition in the absence of a surfactant).

The water-based drilling mud composition was maintained in a specific pH range, for example, an alkaline pH range, by adding a pH buffer, for example, sodium hydroxide into the nanoparticle-based mud composition to minimize a corrosive effect on surface and down hole tools and equipment. According to some embodiments, in the event of foaming during mixing, a couple of drops of defoamer are added to eliminate the foaming effect and maintain homogeneous density along the fluid column.

The water-based drilling mud composition produced a plastic velocity, for example, of at least 20 cP, a yield point, for example, of at least 25 lbs/100 ft$^2$, a 10/10 gel strength, for example, of at least 27/33 lbs/100 ft$^2$/lbs, an API fluid loss, for example, less than 15 cc, and a mudcake thickness, for example, less than 2 mm in a laboratory measurement of the fluid properties.

Throughout this application, where patents or publications are referenced, the disclosures of these references in their entireties are intended to be incorporated by reference into this application, in order to more fully describe the state of the art to which the invention pertains, except when these reference contradict the statements made herein.

The present invention may suitably comprise, consist or consist essentially of the elements disclosed and may be practiced in the absence of an element not disclosed. For example, it can be recognized by those skilled in the art that certain steps can be combined into a single step. Furthermore, language referring to order, such as first and second, should be understood in an exemplary sense and not in a limiting sense. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a", "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optional" or "optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention.

Accordingly, the scope of the present invention should be determined by the following claims and their appropriate legal equivalents.

We claim:

1. A method of drilling a hydrocarbon formation, the method comprising:
    contacting the hydrocarbon formation with a water-based drilling mud composition while drilling or completing a well,
    the water-based drilling mud composition comprising:
        water, the water being present in an amount greater than about 90 wt % of the water-based drilling mud composition to maintain flowability of the water-based drilling mud composition;
        drilling mud, the drilling mud comprising particles, wherein the particles are selected from the group consisting of microparticles, nanoparticles, and combinations thereof; and
        a multi-functional mud additive in an amount of 0.8 wt % of the water-based drilling mud composition, the multi-functional mud additive comprising psyllium husk powder, such that the water-based drilling mud composition is operable to keep the particles stabilized and dispersed throughout the drilling mud composition in the absence of a surfactant;
    wherein the psyllium husk powder comprises at least 85% by weight husk particles.

2. The method as claimed in claim 1, wherein the water-based drilling mud composition further comprises 2 pounds per barrel of 99% pure psyllium husk powder with 2 pounds per barrel of xanthan gum, 3 pounds per barrel of 85% pure psyllium husk powder with 3 pounds per barrel of xanthan gum, and 20 pounds per barrel of volcanic ash.

3. The method as claimed in claim 1, wherein the contacting the hydrocarbon formation with the water-based drilling mud composition is performed prior to having a loss of circulation of fluids in excess of one barrel per hour.

4. The method as claimed in claim 1, wherein the contacting comprises applying the water-based drilling mud composition to the hydrocarbon formation, the water-based drilling mud composition including the multi-functional mud additive having a volume-to-surface area ratio operable to reduce van der Waals forces between the particles, such that the particles do not stick together.

5. The method as claimed in claim 1, wherein the multi-functional mud additive is operable to increase the viscosity of the water-based drilling mud composition.

6. The method as claimed in claim 1, wherein the multi-functional mud additive is operable to increase a viscosity of the water-based drilling mud composition by at least 10 cP.

7. The method as claimed in claim 1, wherein the multi-functional mud additive is operable to provide additional gelling capacity for the water-based drilling mud composition.

8. The method as claimed in claim 1, wherein the water-based drilling mud composition further comprises an absence of a dispersant.

9. The method as claimed in claim 1, wherein the water-based drilling mud composition further comprises an absence of a polyanionic cellulose.

10. The method as claimed in claim 1, wherein the water-based drilling mud composition further comprises an absence of psyllium seed particles.

11. The method as claimed in claim 1, wherein the water-based drilling mud composition further comprises xanthan gum.

12. The method as claimed in claim 1, wherein the water-based drilling mud composition further comprises volcanic ash.

13. The method as claimed in claim 1, wherein the nanoparticles of the drilling mud of the water-based drilling mud composition are selected from the group consisting of carbon black, single wall nanotubes, multiwall nanotubes, functionalized carbon blacks, functionalized single wall nanotubes, functionalized multiwall nanotubes, graphene, and combinations thereof.

14. The method as claimed in claim 1, wherein the microparticles of the drilling mud of the water-based drilling mud composition are selected from the group consisting of bentonite, volcanic ash, mica, carbonate powder, and combinations thereof.

15. The method as claimed in claim 1, wherein the water-based drilling mud composition further comprises a pH buffer.

16. The method as claimed in claim 15, wherein the predetermined pH range is alkaline.

17. The method as claimed in claim 15, wherein the pH buffer is selected from the group consisting of sodium hydroxide, potassium hydroxide, lime, or combinations thereof.

18. The method as claimed in claim 1, wherein the water-based drilling mud composition comprises a plastic viscosity of at least 15 cP, a yield point of at least 45 lbs/100 ft2, and a 10/10 gel strength of at least 25/30 lbs/100 ft2, and wherein the water-based drilling mud composition is operable to achieve an American Petroleum Institute fluid loss of less than 15 cc and a mudcake thickness of less than 2 mm.

19. The method as claimed in claim 12, volcanic ash is selected from the group consisting of silica, aluminum oxide, lime, ferric oxide, magnesium oxide, and combinations thereof.

20. The method as claimed in claim 1, wherein the water-based drilling mud composition further comprises a pH buffer in an amount sufficient to keep the water-based drilling mud composition in an alkaline pH;
    wherein the particles include COOH functionalized nanoparticles, and
    wherein the water-based drilling mud composition is operable to keep the particles stabilized and dispersed for at least 48 hours following a hot rolling treatment.

21. The method as claimed in claim 1, wherein the water-based drilling mud composition comprises a plastic viscosity of less than 20 cP, a yield point of at least 25 lbs/100 ft2, and a 10/10 gel strength of at least 27/33 lbs/100 ft2, wherein the water-based drilling mud composition is operable to achieve an American Petroleum Institute fluid loss of less than 15 cc and a mudcake thickness of less than 2 mm.

* * * * *